Oct. 23, 1934.  H. SPECHT  1,977,923
PROCESS FOR SEPARATING DISSOLVED VOLATILE SUBSTANCES FROM THEIR SOLVENTS
Filed July 11, 1932  2 Sheets-Sheet 1

Inventor:
H. Specht
By: Marks & Clerk
Attys.

Oct. 23, 1934.   H. SPECHT   1,977,923
PROCESS FOR SEPARATING DISSOLVED VOLATILE SUBSTANCES FROM THEIR SOLVENTS
Filed July 11, 1932   2 Sheets-Sheet 2

Inventor:
H. Specht
By: Marks & Clerk
Attys.

Patented Oct. 23, 1934

1,977,923

UNITED STATES PATENT OFFICE 1,977,923

PROCESS FOR SEPARATING DISSOLVED VOLATILE SUBSTANCES FROM THEIR SOLVENTS

Hugo Specht, Mannheim, Germany, assignor to Holzhydrolyse Aktiengesellschaft, Heidelberg, Germany Application July 11, 1932, Serial No. 622,003
In Germany June 23, 1930

6 Claims. (Cl. 202—57)

This invention relates to an improved method and an apparatus for separating dissolved volatile substances from their solvents by heating these solutions in the presence of bodies capable of taking up the solvent (absorbents) and restoring the diluted solution of the latter to the original concentration by the action of heat. For instance aqueous solutions are heated in the presence of calcium chloride or sulphuric acid.

In the processes known hitherto, the absorbents were circulated by means of pumps which meant complicated plant and expenditure of power. By means of the present invention it is possible to carry out both the gasification of the volatile substances and the reconcentration of the absorbent in one simple apparatus without any pumping of the liquid. This is accomplished by making use of two communicating chambers which are also connected at their upper parts by means of a tube so that a circulation of the absorbing agent can take place. The circulation is established by the difference between the specific gravity of the liquid in the chamber into which the solution of volatile substance enters, and that of the liquid in the communicating chamber which serves for the reconcentration. The circulation of the absorbing liquid depends entirely on the separation between solvent and volatile substance and no special appliances for moving the liquid are required.

The accompanying drawings show two suitable arrangements for carrying out the invention.

Figure 1:
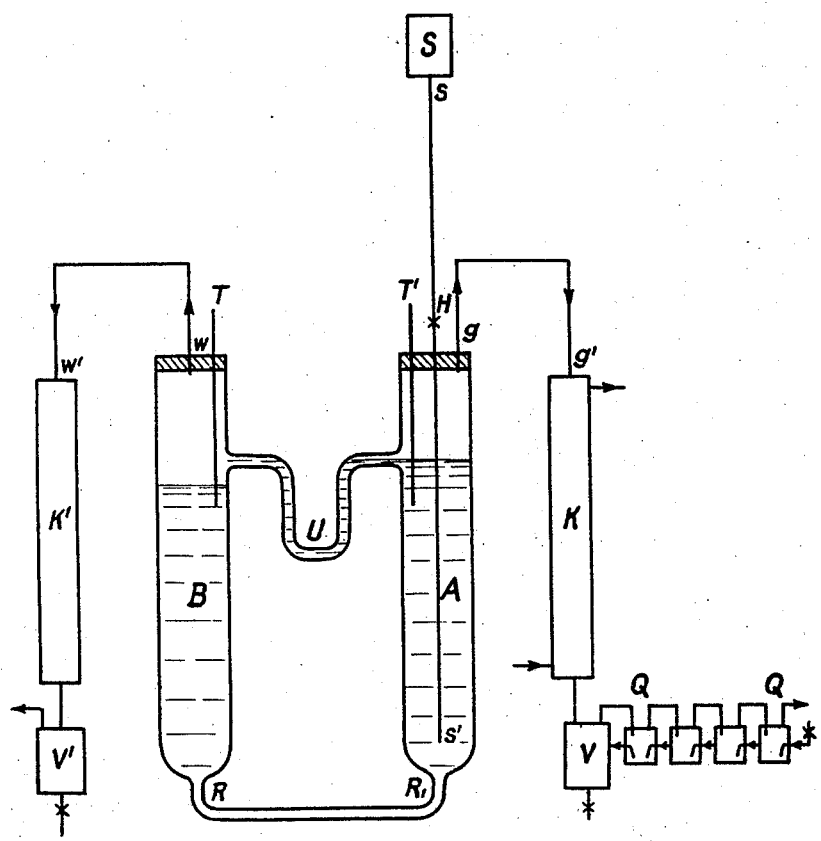

In the arrangement shown in Fig. 1 two chambers A and B of the apparatus communicate at their lower ends through the pipe line R R', while additional communication in the upper part is established by means of the U-shaped tube U. Both communicating chambers A and B are filled with a concentrated solution of a substance capable of absorbing the solvent, and are heated.

The working of the process will now be described in detail, by way of example, for the gasification of a 30% hydrochloric acid. In this case vessels A and B contain concentrated calcium chloride solution having a sp. gr. of about 1.6. From reservoir S the hydrochloric acid to be gasified enters through inlet-tubes ss' (provided with a regulating cock H) into the lowest part of vessel A in which the calcium chloride solution meanwhile has been heated to about 130–135° C. The acid is gasified, and the water is absorbed by the lye which thereby is diluted. The hydrogen chloride gas expelled passes through pipeline gg' into condenser K, where a hydrochloric acid solution of about 38.40% is liquefied and collected in receptacle V, while the surplus hydrogen chloride is caught in known absorbing vessels Q.

From the vessel A the diluted lye continuously passes over through tube U into the upper part of the chamber B, which is kept at a temperature of e. g., 150° C. The water taken up in A evaporates, the vapors escape through pipeline ww' to condenser K' and receiver V' where they accumulate as a slightly acidulated condensed water. Owing to the evaporation of the water, the calcium chloride solution in vessel B becomes concentrated. Owing to the difference in specific gravity, it drops back through pipe line RR₁ into vessel A and the circuit is started anew.

100 parts hydrogen chloride originally contained in the 30% hydrochloric acid in reservoir S, treated according to this method, furnished 18 parts of hydrogen chloride in aqueous solution of 40% strength in receiver V and 78% as concentrated gaseous hydrogen chloride in the absorbing vessels Q, while the residual 4 parts will be found in the condensed water-vapors in the receiver V'.

The process described may also be utilized for continuously separating a mixture of volatile bodies, such as hydrochloric acid from acetic acid. The more readily volatile hydrochloric acid being driven off first, the main part of the acetic acid accumulates in receptacle V' together with the condensed water.

The process may be further improved in two directions:

1. The particles of solvent carried off with the vapors of the expelled volatile substance are eliminated, e. g. by condensation. The solvent separated out of the vapor of the volatile substance is returned to the gasification chamber to be decomposed anew. Thus the volatile substance is almost completely freed from the solvent and the latter is recovered almost entirely pure.

2. The absorbent, upon leaving the gasification space of the apparatus, is given an opportunity to deposit the rest of the volatile substance in an intermediate vessel.

Figure 2:
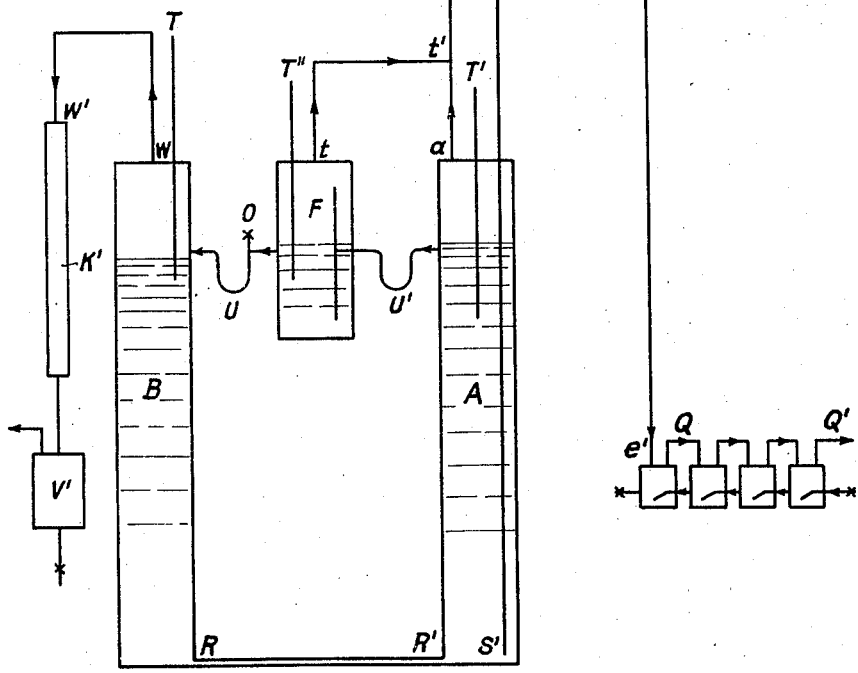

Figure 2 of the drawings shows schematically a device for carrying out the process under the assumption, by way of example, that concentrated calcium chloride lye contained in vessels A and B is to serve for the dehydration of an aqueous solution containing 30% hydrogen chloride. Leaving reservoir S through exchanger W, this acid solution enters vessel A by the pipeline ss'. Slightly aqueous hydrogen chloride gas escapes through the pipe line aa', gives up part of its heat in W to the fresh solution and is further cooled down in K. The condensate drops into the separating device E and flows back to vessel A while, through the pipe line ee', hydrogen chloride gas almost free from solvent leaves the apparatus.

The diluted calcium chloride solution flows over at U' into a small intermediate vessel F where it can give off the residual hydrogen chloride into the pipe line tt'. A throttle valve O regulates the passage from F into chamber B in which the lye is heated high enough to drive out the absorbed water. Having thus attained its original concentration, the calcium chloride lye sinks down and is forced back, through pipe RR', into vessel A. Thus the circuit is completed. The expulsion of the volatile substance in the intermediate vessel F can be helped by additional heating or by ventilation.

From 100 parts of hydrogen chloride originally present 98.8 parts are thus recovered as very nearly dry gaseous hydrogen chloride, while only 1.2 parts are retained in the water vapors escaping during regeneration of the absorbent.

Starting from an aqueous mixture of about 27% hydrogen chloride and 9% acetic acid, the amount of acetic acid escaping with the hydrogen chloride gas can be kept as low as 3.7% of the amount originally present; 96.3% of the acetic acid may be regained from the water distilling off during the reconcentration of the calcium chloride.

The process is not limited to the expulsion of volatile acids from their solutions for the purpose of separating them. Neither is it limited to the use of calcium chloride solution and sulphuric acid. Thus for the regeneration of hydrochloric acid magnesium chloride may also be used. Other volatile bodies, for instance, alcohol, may likewise be driven out of their solutions and concentrated in this manner. Nitric acid may be obtained from its aqueous solution by treating the latter with sulphuric acid in accordance with the present process. When the solvent for the volatile body is a substance other than water, an agent which is capable of taking up and retaining the solvent concerned has to be filled into vessels A and B.

What I claim is:

1. A process for separating hydrogen chloride from a solution of the same in water by treatment of the solution with an absorbent consisting of heated concentrated calcium chloride solution, consisting in introducing the hydrogen chloride solution into a circulating stream of the hot absorbent at one portion of the circuit, whereby the solvent water is absorbed at this portion and the hydrogen chloride liberated, bringing the liberated hydrogen chloride into heat-interchange relationship with the hydrogen chloride solution being supplied to the absorbent in order to preheat said solution, further cooling down said liberated hydrogen chloride and collecting the gaseous product and introducing any condensate which may form into the circulating absorbent at that portion of the circuit where the hydrogen chloride is liberated, and at another portion of the absorbent circuit applying additional heat for the purpose of expelling the absorbed water, the continuous circulation of the absorbing liquid being maintained merely by the difference between its concentration at the place where the hydrogen chloride is liberated and at the place where the absorbed water is expelled.

2. A process for separating hydrogen chloride from a solution of the same in water by treatment of the solution with a heated calcium chloride solution, consisting in introducing the hydrogen chloride solution into a circulating stream of the hot absorbent at one portion of the circuit, whereby the solvent water is absorbed at this portion and the hydrogen chloride liberated, and at another portion of the absorbent circuit applying additional heat for the purpose of expelling the absorbed water, the continuous circulation of the absorbing liquid being maintained merely by the difference between its concentration at the place where the hydrogen chloride is liberated and at the place where the absorbed water is expelled.

3. A process for separating hydrogen chloride from a solution of the same in water by treatment of the solution with a heated calcium chloride solution, consisting in introducing the hydrogen chloride solution into a circulating stream of the hot absorbent at one portion of the circuit, whereby the solvent water is absorbed at this portion and the hydrogen chloride liberated, bringing the liberated hydrogen chloride into heat-interchange relationship with the hydrogen chloride solution being supplied to the absorbent in order to preheat said solution and collecting same, and at another portion of the absorbent circuit applying additional heat for the purpose of expelling the absorbed water, the continuous circulation of the absorbing liquid being maintained merely by the difference between its concentration at the place where the hydrogen chloride is liberated and at the place where the absorbed water is expelled.

4. In the process claimed in claim 2, conducting the circulating liquid after it has passed that portion of the circuit where the hydrogen chloride is expelled, but before it reaches that portion of the circuit where the absorbed solvent water is liberated, through a space for the purpose of allowing it to yield up residual hydrogen chloride.

5. In the process claimed in claim 3, conducting the circulating liquid after it has passed that portion of the circuit where the hydrogen chloride is expelled, but before it reaches that portion of the circuit where the absorbed solvent water is liberated, through a space for the purpose of allowing it to yield up residual hydrogen chloride, the volatile solute here liberated being brought, together with that already expelled, into heat-interchange relationship with the solution being supplied to the absorbent.

6. A process for separating a dissolved fluid volatile solute from a solution of the same in water by treatment of the solution with a liquid absorbent for water, which absorbent is specifically heavier than the solution, consisting in introducing the solution into a circulating stream of the absorbent at one portion of the circuit, whereby the water is absorbed at this portion and the volatile solute liberated, and at another portion of the circuit applying heat for the purpose of expelling the absorbed water, the continuous circulation of the absorbing liquid being maintained merely by the difference between its concentration at the place where the solution is introduced and at the place where the water is expelled.

HUGO SPECHT.